US011287001B2

(12) United States Patent
Biondo et al.

(10) Patent No.: US 11,287,001 B2
(45) Date of Patent: Mar. 29, 2022

(54) VENTILATED BRAKING BAND, ASSEMBLY OF VENTILATED BRAKE DISC AND METHOD OF VENTILATION

(71) Applicant: FRENI BREMBO S.P.A., Bergamo (IT)

(72) Inventors: Simone Biondo, Curno (IT); Fabrizio Paggi, Curno (IT); Stefano Medici, Curno (IT); Michele Donati, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 335 days.

(21) Appl. No.: 16/083,040

(22) PCT Filed: Mar. 7, 2017

(86) PCT No.: PCT/IB2017/051310
§ 371 (c)(1),
(2) Date: Sep. 7, 2018

(87) PCT Pub. No.: WO2017/153902
PCT Pub. Date: Sep. 14, 2017

(65) Prior Publication Data
US 2020/0300318 A1 Sep. 24, 2020

(30) Foreign Application Priority Data

Mar. 7, 2016 (IT) .................. 102016000023586

(51) Int. Cl.
*F16D 65/12* (2006.01)
*F16D 65/00* (2006.01)
*F16D 65/02* (2006.01)

(52) U.S. Cl.
CPC .... *F16D 65/128* (2013.01); *F16D 2065/1308* (2013.01); *F16D 2065/1328* (2013.01)

(58) Field of Classification Search
CPC .... F16D 65/121; F16D 65/123; F16D 65/127; F16D 65/84; F16D 2065/788;
(Continued)

(56) References Cited

U.S. PATENT DOCUMENTS 3,732,953 A * 5/1973 Huet ............... F16D 65/128
188/218 XL
4,260,047 A * 4/1981 Nels ............... F16D 13/648
188/251 A
(Continued)

FOREIGN PATENT DOCUMENTS

DE 4332693 A1 3/1995
DE 19925003 A1 12/2000
(Continued)

OTHER PUBLICATIONS

European Patent Office, International Search Report with Written Opinion issued in PCT/IB2017/051310, dated Aug. 22, 2017, 13 pages, European Patent Office, Rijswijk, Netherlands.

*Primary Examiner* — Melody M Burch
(74) *Attorney, Agent, or Firm* — Marshall & Melhorn, LLC (57) ABSTRACT

A ventilated braking band for brake disc having a first plate and a second plate; the first plate has at least a first inner surface, and the second plate has a second inner surface. The first inner surface defines a first inner surface plane or level (z1-z1) coinciding with said first inner surface, and the said second inner surface defines a second inner surface plane or level (z2-z2) coinciding with the second inner surface. The ventilated braking band has connecting elements which extend in an axial direction between the first inner surface and the second inner surface. The ventilated braking band has at least one bulge. The at least one bulge is partially interpenetrated with: at least one portion of the first foot, thus forming a structural continuity with the first foot, thus (Continued)

avoiding the first inner surface level from being reached; or at least one portion of a second foot, thus forming a structural continuity with the second foot, thus avoiding the second inner surface level from being reached.

16 Claims, 9 Drawing Sheets

(58) Field of Classification Search
CPC ..... F16D 2065/1308; F16D 2065/1312; F16D 2065/1328; F16D 65/128
See application file for complete search history.

(56) References Cited

U.S. PATENT DOCUMENTS

| | | | |
|---|---|---|---|
| 5,526,905 A | 6/1996 | Shimazu et al. | |
| 7,934,586 B1* | 5/2011 | Black | F16D 65/128 |
| | | | 188/218 XL |
| 2007/0193837 A1* | 8/2007 | Lamb | F16D 65/12 |
| | | | 188/218 XL |
| 2012/0255820 A1* | 10/2012 | McCord | F16D 65/12 |
| | | | 188/218 XL |
| 2018/0163802 A1* | 6/2018 | Boffelli | F16D 65/128 |

FOREIGN PATENT DOCUMENTS

| | | |
|---|---|---|
| DE | 202006017092 U1 | 1/2007 |
| DE | 2102013210700 A1 | 12/2014 |
| DE | 202015102580 U1 | 10/2015 |
| EP | 2192321 A1 | 6/2010 |
| GB | 2060796 A | 5/1981 |
| GB | 2116654 A | 9/1983 |
| GB | 2286438 A | 8/1995 |
| WO | 2008078352 A1 | 7/2008 |
| WO | 2008135876 A2 | 11/2008 |
| WO | 2008136032 A2 | 11/2008 |
| WO | 2011058594 A1 | 5/2011 |
| WO | 2012164465 A1 | 12/2012 |
| WO | 2015092671 A1 | 6/2015 |

* cited by examiner

VENTILATED BRAKING BAND, ASSEMBLY OF VENTILATED BRAKE DISC AND METHOD OF VENTILATION

FIELD OF THE INVENTION

The present invention relates to a ventilated braking band for a ventilated brake disc, as well as to a ventilated brake disc assembly comprising said ventilated braking band.

The present invention also relates to a method of ventilating a braking band.

BACKGROUND ART

In a general brake disc, a system of cylindrical coordinates is generally defined, comprising an axial direction (A-A) coinciding with the rotation axis (X) of the brake disc, a radial direction (R-R) orthogonal to the axial direction, and a tangential or circumferential direction (C-C) orthogonal both to the axial direction (A-A) and to the radial direction (R-R).

Brake discs of the ventilated type are generally known, i.e. comprising a ventilated braking band which comprises two plates on which opposite braking surfaces are obtained being adapted to act in conjunction with opposite brake pads of a brake caliper which can be associated with the brake disc to exert the braking action, in which said two plates are spaced apart in axial direction, thus delimiting a gap. Ventilated brake discs are provided with a plurality of axial connecting elements such as fins or pegs, which structurally connect together said two plates, thus forming said gap in conjunction with the two plates. For example, this type of brake disc is known from International Patent Applications Nos. WO-2011-058594 and WO-2012-164465, and also from documents Nos. GB-2286438, DE-4332693, DE-19925003 and U.S. Pat. No. 5,526,905 to the same Applicant.

This type of brake disc has the advantage that the variously shaped connecting elements of the braking band delimit a plurality of ventilation channels in the gap between the plates, which are adapted to convey a fluid current for cooling the brake disc when the brake disc rotates. In particular, it is important for the fluid current to be in turbulent operation in order to maximize the cooling. For example, International Patent Application No. WO-2008-078352 shows blind holes made on the inner surface of the plate to increase the turbulence of the cooling current. The holes made on the inner surface of the plate are sites of concentration of the stresses dangerously adapted to trigger cracks, thus necessarily limiting the mechanical resistance of the plates, mass being equal, or imposing an increase in mass to maintain an adequate mechanical resistance.

Moreover, as is known, brake disc temperatures which are too high cause a decreased efficiency of the braking action and simultaneously may cause the occurrence of cracks in the body of the brake disc itself.

For example, it is known from documents Nos. EP-2192321, DE-202006-017092, GB-2060796 and GB-2116654 to provide bosses or protrusions on the inner surfaces of the plates and separated from the connecting elements to increase the turbulence of the cooling current flow and to provide reasonably distributed reinforcements adapted to contrast the propagation of cracks. Such solutions necessarily impose an increase of the mass of the disc.

For example, International Patent Application No. WO-2015-092671 to the same Applicant shows a ventilated brake disc comprising connecting elements between the two plates with which fitting burrs are associated, which extend from the connecting elements thus connecting them to the plates.

Although it is partly advantageous in reducing the occurrence of cracks in the body of the brake disc, such a solution in any case has certain drawbacks.

Indeed, the provision of said fitting burrs makes the manufacturing of the brake disc laborious, and particularly the step of extracting the core material from the gap between the two plates, which has narrow and tortuous ventilation channels.

Moreover, although the provision of said fitting burrs increases the turbulence of the cooling fluid current and the heat exchange surface of the connecting elements, it necessarily increases the volume, and therefore the weight, of the connecting elements themselves and of the whole brake disc. Accordingly, in order to ensure the structural integrity of the brake disc when it is in operating conditions, the above-mentioned increase in weight imposes making connecting elements, such as fins or pegs, with a particularly stocky cross section, for example diamond-shaped, as is clearly shown for example, from the cross-sections of fin shown in FIGS. 2, 4, 5 and 6 of document No. WO-2015-092671.

Additionally, as is known, the weight of the brake disc is directly proportional with the inertia of the brake disc during the braking. For example, it is known from document DE-4332693 to make axially-directed through holes in the connecting elements to lighten the brake disc. However, this type of drillings also imposes a structural weakening of the disc.

The need is therefore strongly felt to obviate the drawbacks of the known art mentioned hereto.

Therefore, the need is felt to provide a structurally resistant ventilated brake disc while allowing the possibility of making lightweight and thin connecting elements.

At the same time, the need is felt to provide a ventilated brake disc with improved lightness with respect to known solutions, without reducing the properties of structural and heat resistance of the brake disc itself.

Solution

It is an object of the present invention to obviate the drawbacks of the prior art mentioned hereto.

It is an object of the present invention to provide a solution of ventilated braking band and also of ventilated brake disc adapted to cause a turbulent fluid current for disposing of the heat from the brake disc in the gap between the plates when the brake disc is rotating.

It is an object of the present invention to provide a ventilated braking band and also a ventilated brake disc having increased heat exchange surface with respect to known solutions, mass being equal, or having decreased weight, heat exchange surface being equal, without therefore providing decreased mechanical and structural resistance.

It is an object of the present invention to provide a ventilated braking band and also a ventilated brake disc which, although it is structurally strong, allows making connecting elements such as lightweight fins or pegs, while allowing to make thin plates, or thinner plates with respect to known solutions.

It is a further object of the present invention to provide a ventilated braking band and also a ventilated brake disc of the ventilated type adapted to exert a prompt braking when clamped between the brake pads of a brake caliper.

It is a further object of the present invention to provide a method of ventilating a braking band adapted to efficiently disposing of the heat accumulated in the plates.

These and other objects are achieved by a ventilated braking band, by a ventilated brake disc assembly, and by with a ventilation method according to the claims.

Certain advantageous embodiments are the subject matters of the dependent claims.

DRAWINGS

Further features and advantages of the ventilated braking band, the ventilated brake disc assembly and the method according to the invention will become apparent from the description provided below of preferred embodiments thereof, given by way of non-limiting example, with reference to the accompanying drawings, in which:

FIG. 1bis is a diagrammatical sectional view showing a portion of a ventilated brake disc assembly according to one embodiment, and associable brake pads;

DESCRIPTION OF SOME PREFERRED EMBODIMENTS

With reference to the accompanying figures, numeral 100 indicates a ventilated braking band for brake disc as a whole.

A brake disc defines an axial direction A-A coinciding with the rotation axis X of the brake disc, a radial direction R-R orthogonal to the axial direction A-A, and a tangential C-C or circumferential direction C-C orthogonal to both the axial direction A-A and the radial direction R-R.

According to a general embodiment, a ventilated braking band 100 comprises a first plate 2 and a second plate 3, which are coaxial to the same axial direction A-A.

Figure 1:
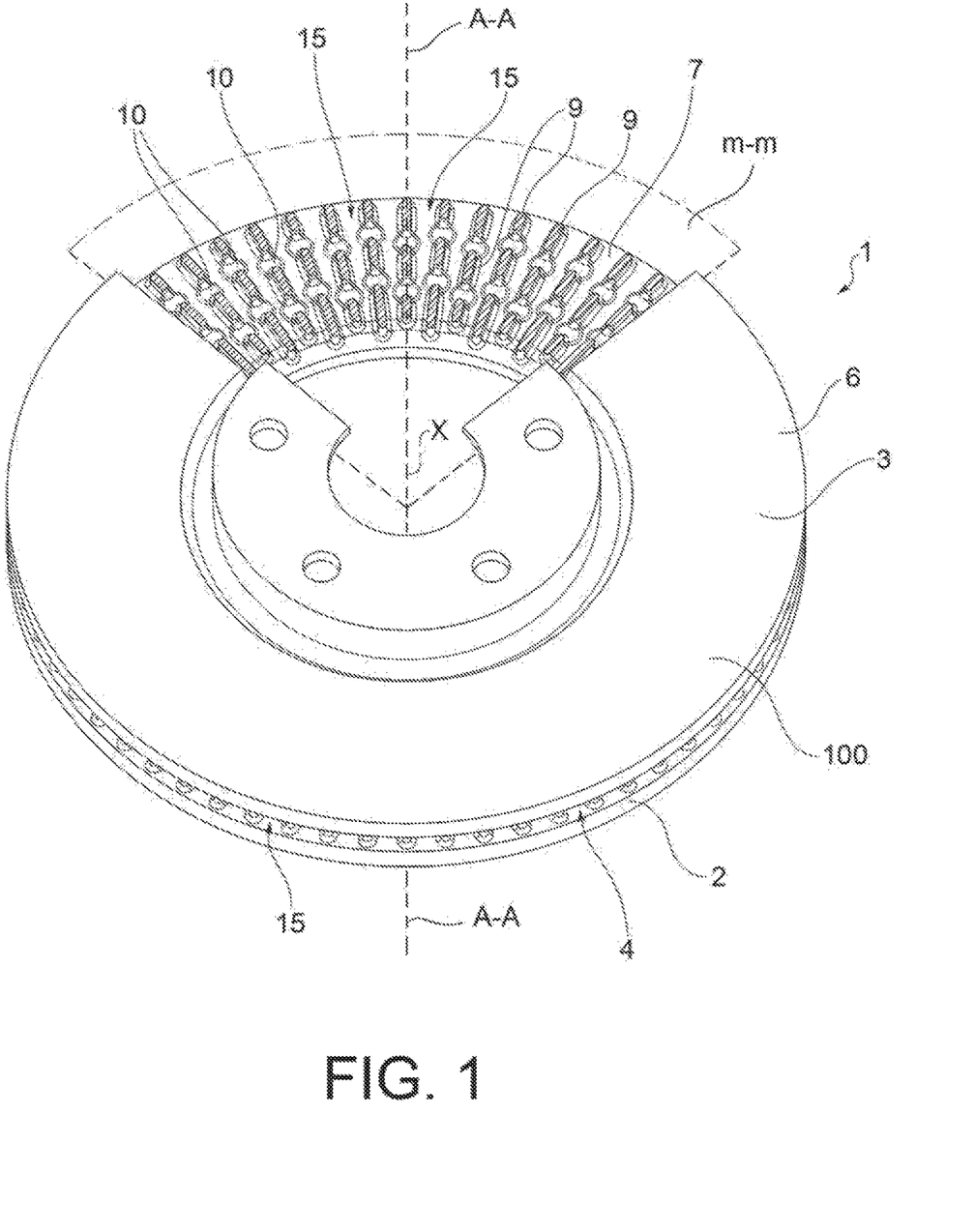
FIG. 1 is an axonometric view of a ventilated brake disc assembly according to one embodiment, in which the plate on the side of the disc bell is partially cross-sectioned along the cutting plane m-m.
Figure 2:
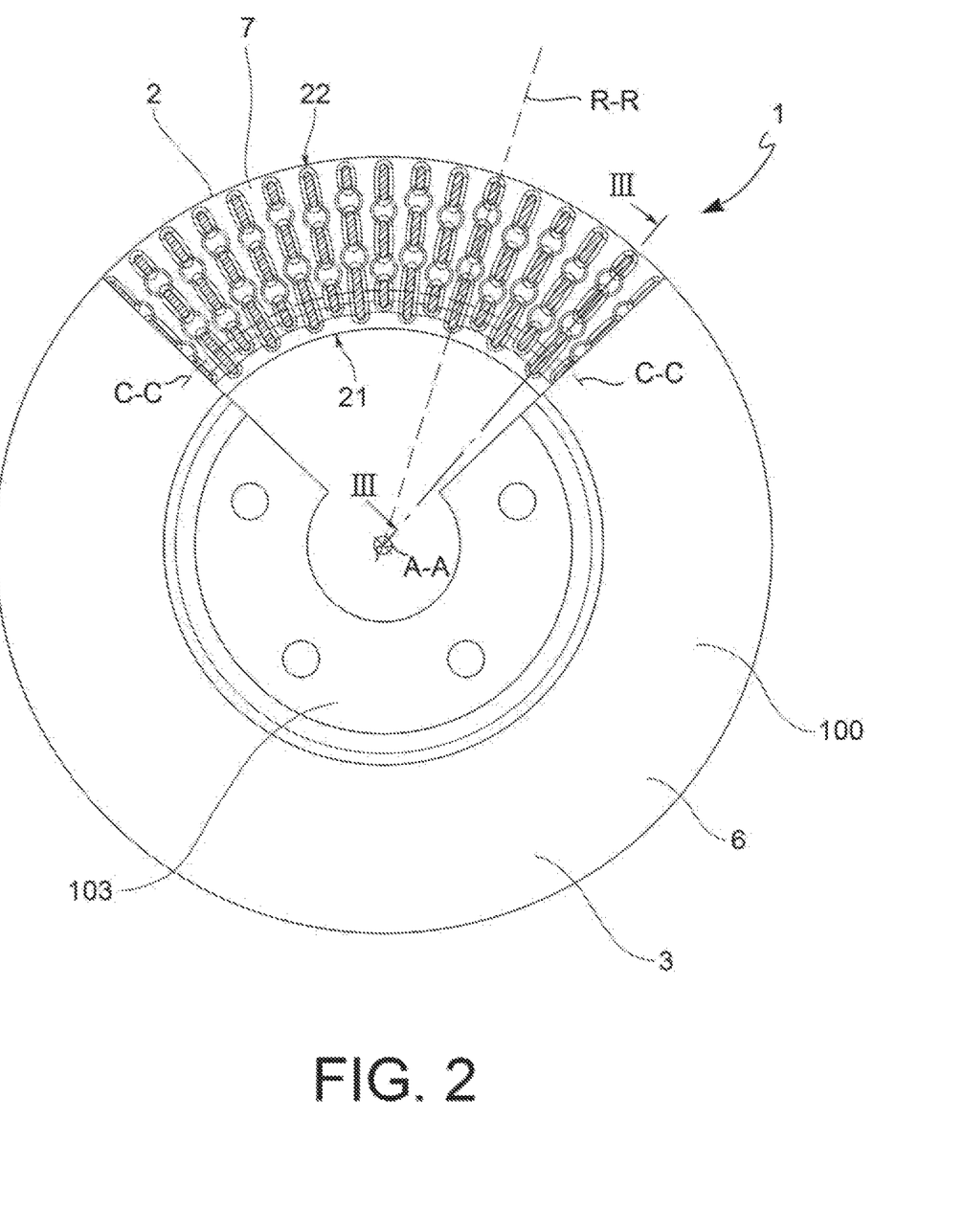
FIG. 2 is a front view of a ventilated brake disc according to the embodiment shown in FIG. 1, in which the plate on the side of the disc bell is partially cross-sectioned along the cutting plane m-m in FIG. 1.
Figure 3:
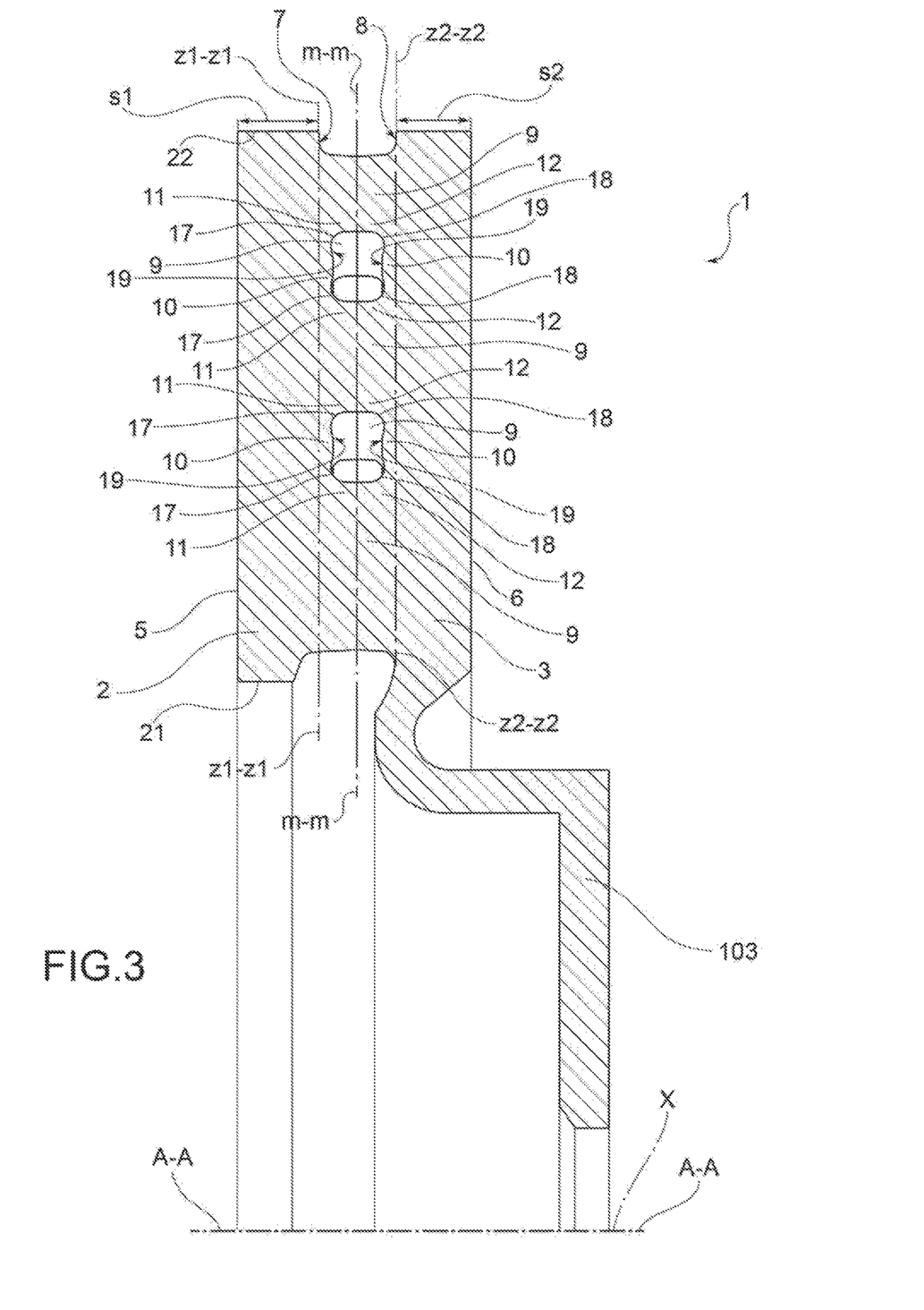
FIG. 3 is a sectional view of a ventilated braking band according to a cutting plane parallel to line III-III in FIG. 2.
Figure 4:
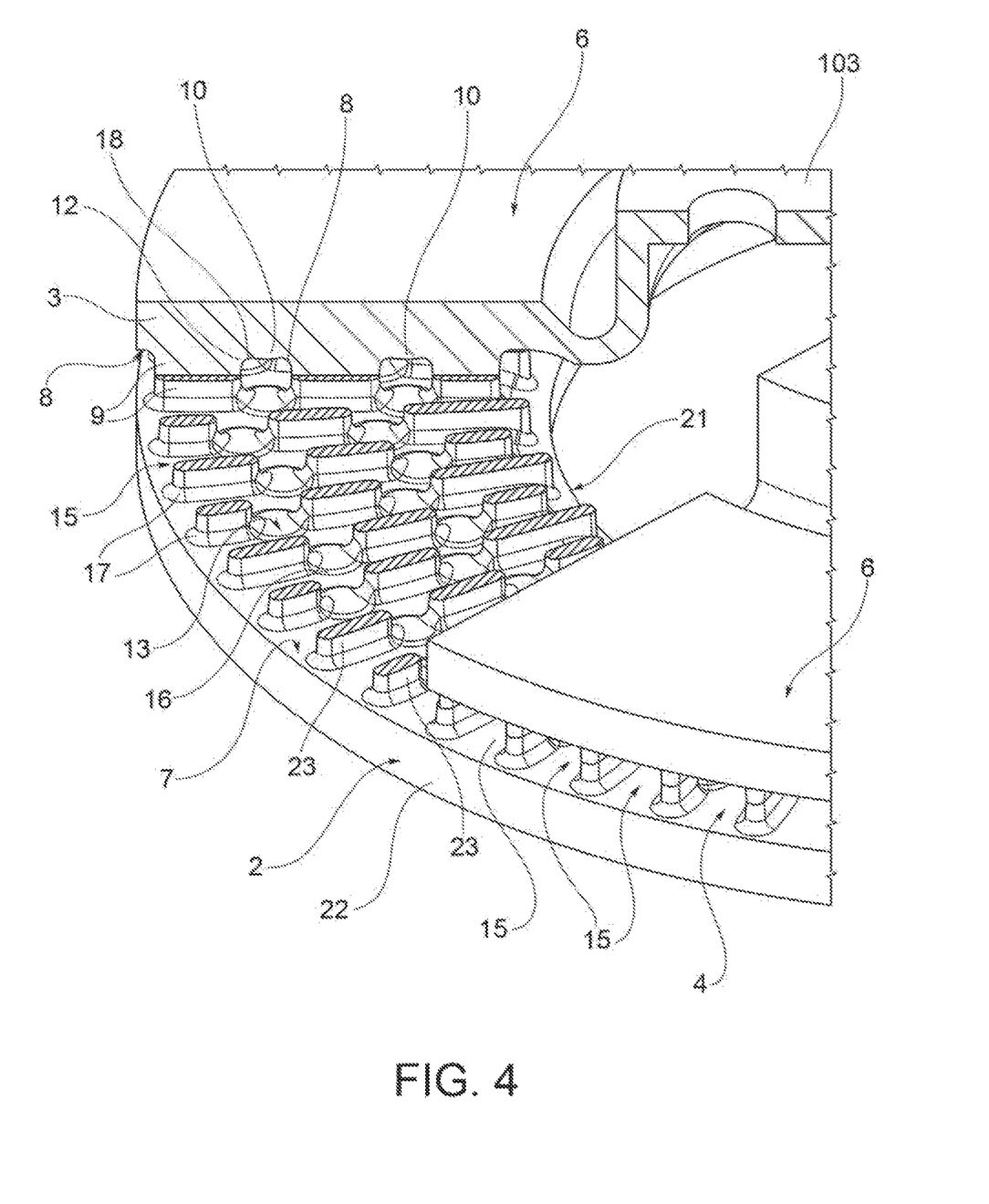
FIG. 4 is an axonometric view of a portion of a ventilated brake disc according to the embodiment shown in FIGS. 1, 1bis, 2 and 3, in which the plate on the side of the disc bell is partially cross-sectioned.

According to one embodiment, at least one between said first plate 2 and said second plate 3 is adapted to be connected to a disc bell which can be associated with the ventilated braking band 100. By way of non-limiting example, according to one embodiment shown in FIG. 1bis, the second plate 3 is connected to the disc bell 103 which can be associated with the ventilated braking band 100.

Said first plate 2 and said second plate 3 are mutually spaced apart in axial direction A-A so as to delimit a gap 4 therebetween.

Said first plate 2 comprises a first braking surface 5 adapted to face at least a first brake pad 101 of a brake caliper which can be associated with said ventilated braking band 100, and said second plate 3 comprises a second braking surface 6, parallel and opposite to said first braking surface 5, so as to be adapted to face at least a second brake pad 102, opposite to said first brake pad of said brake caliper which can be associated with said ventilated braking band 100.

Said first plate 2 comprises at least a first inner surface 7 facing said second plate 3.

Said first inner surface 7 is substantially parallel to said first braking surface 5.

Said second plate 3 comprises a second inner surface 8 facing said first plate 2.

Said second inner surface 8 is substantially parallel to said second braking surface 6.

Said first inner surface 7 defines a first inner surface plane or level z1-z1 coinciding with said first inner surface 7. The distance between said first inner surface level z1-z1 and said first braking surface 5 defines a first plate thickness s1.

Said second inner surface 8 defines a second inner surface plane or level z2-z2 coinciding with said second inner surface 8. The distance between said second inner surface level z2-z2 and said second braking surface 6 defines a second plate thickness s2.

According to a preferred embodiment, said first inner surface level f z1-z1 and said second inner surface level z2-z2 are substantially parallel to each other.

Said ventilated braking band 100 comprises connecting elements 9 which extend in axial direction A-A between said first inner surface 7 and said second inner surface 8, thus connecting together said first plate 2 and said second plate 3.

Said connecting elements 9 and said first inner surface 7 and said second inner surface 8 at least partially delimit ventilation channels 15 inside said gap 4, and in which said ventilation channels 15 are adapted to convey a fluid current flow for cooling said ventilated braking band 100.

Each connecting element 9 comprises at least a first foot 11 which connects each connecting element 9 to said first inner surface 7, and at least a second foot 12 which connects each connecting element 9 to said second inner surface 8.

Said ventilated braking band 100 comprises at least one bulge 10 which protrudes from a plate 2, 3 in said gap 4 without reaching the oppositely facing plate 3, 2.

According to one embodiment, said at least one bulge 10 protrudes from said first plate 2 without reaching said second plate 3.

According to one embodiment, said at least one bulge 10 protrudes from said second plate 3 without reaching said first plate 2.

Advantageously, said at least one bulge 10 substantially has the shape of at least one portion of a sphere.

The provision of such a bulge 10 in the shape of at least one portion of a sphere allows the heat exchange surface of bulge 10 to be made larger than any other shape, without discontinuities, and easily, the mass added to the plate being equal. At the same time, the provision of said at least one bulge 10 in the shape of at least one portion of a sphere allows a constriction in said gap 4 to be at least partially delimited, thus affecting the fluid current flow for cooling the ventilated braking band 100, for example by increasing the speed and turbulence thereof. As is known, this causes an increase of the cooling efficiency of the ventilated braking band 100 when it is in operating conditions.

According to one embodiment, said at least one bulge 10 is partially interpenetrated with at least one portion of said first foot 11, thus forming a structural continuity with said first foot 11, thus avoiding said first inner surface level z1-z1 from being reached.

The term "structural continuity" hereinafter means the provision of a continuous portion of material which comprises said at least one bulge 10 and at least one portion of foot 11, 12.

The provision of said at least one bulge 10 partially interpenetrated with at least one portion of said first foot 11 avoids a structural discontinuity from being formed between said at least one bulge 10 and at least one portion of said first foot 11 such as to bring back to the first inner surface level z1-z1.

Advantageously, the provision of said at least one bulge 10 partially interpenetrated with at least one portion of said first foot 11 which avoids said first inner surface level z1-z1 from being reached, structurally strengthens the first plate 2, thus avoiding or delaying the propagation of cracks. Thereby, said first plate thickness s1 may be obtained so that said first plate 2 is thinner, and therefore lighter, with respect to known solutions, structural resistance being equal, or said first plate 2 may be made more structurally resistant than known solutions, mass being equal.

According to one embodiment, said at least one bulge 10 is partially interpenetrated with at least one portion of said second foot 12, thus forming a structural continuity with said second foot 12 which avoids said second inner surface level z2-z2 from being reached.

The provision of said at least one bulge 10 partially interpenetrated with at least one portion of said second foot 12 avoids a structural discontinuity from being formed between said at least one bulge 10 and at least one portion of said second foot 12 such as to bring back to the second inner surface level z2-z2.

Advantageously, said at least one bulge 10 partially interpenetrated with at least one portion of said second foot 12 structurally strengthens the second plate 3, thus avoiding or delaying the propagation of cracks. Thereby, said second plate thickness s2 may be obtained so that said second plate 3 is thinner, and therefore lighter, with respect to known solutions, structural resistance being equal, or said second plate 3 may be made more structurally resistant than known solutions, mass being equal.

According to a preferred embodiment, said ventilated braking band 100 comprises a plurality of bulges 10.

The provision of a plurality of bulges 10 allows to at least partially delimit a plurality of constrictions in said gap 4, thus affecting the flow of fluid current for cooling the ventilated braking band 100, for example by increasing the speed and the turbulence, and therefore improving the cooling efficiency of the braking band 100 when in operating conditions.

According to a preferred embodiment, said ventilated braking band 100 comprises a plurality of bulges 10 which protrude from said first plate 2 and a plurality of bulges 10 which protrude from said second plate 3, in which each bulge 10 which protrudes from said first plate 2 is partially interpenetrated with at least one portion of said first foot 11, thus forming a structural continuity with said first foot 11 which avoids said first inner surface level z1-z1 from being reached, and in which each bulge 10 protruding from said second plate 3 is partially interpenetrated with at least one portion of said second foot 12, thus forming a structural continuity with said second foot 12 which avoids said second inner surface level z2-z2 from being reached.

Thereby, both the first plate 2 and the second plate 3 are strengthened and at the same time, an optimized increase of heat exchange surface is supplied for quantity of mass added to the plates 2, 3. Therefore, it is possible to supply a more structurally and thermally resistant ventilated braking band 100 with respect to known solutions, weight being equal, or a lighter one with respect to known solutions, structural and heat resistance being equal.

According to a preferred embodiment, said at least one bulge 10 is made in a single piece with said plates 2, 3 and with said connecting elements 9. In other words, said ventilated braking band 100 is made in a single piece. For example, said ventilated braking band 100 is made in a single piece by means of known foundry processes.

According to one embodiment, said at least one bulge 10 is substantially hemispherical in shape.

According to one embodiment, said at least one bulge 10 is a semi-spherical boss.

According to one embodiment, said at least one bulge 10 substantially has the shape of a spherical sector.

According to one embodiment, said at least one bulge 10 substantially has the shape of a spherical segment of a base.

According to one embodiment, said at least one bulge substantially has the shape of a quarter of a sphere.

According to one embodiment, said at least one bulge 10 substantially has the shape of a spherical wedge.

The provision of different shapes of said at least one bulge allows to tune the fluid-dynamic properties of the flow of cooling fluid current of the braking band 100 by acting on the shape, size and volume of each bulge 10.

According to one embodiment, said at least one bulge 10 comprises a bulge surface 13 which delimits at least one portion of said gap 4, in which said bulge surface 13 is in the shape of at least one portion of spherical cap.

According to one embodiment, said bulge surface 13 is in the shape of a spherical half-cap.

According to one embodiment, said first foot 11 is connected to the first inner surface 7, thus forming at least a first foot fitting 17.

According to one embodiment, said second foot 12 is connected to the second inner surface 8, thus forming at least a second foot fitting 18.

According to one embodiment, said first foot 11 is connected to the first inner surface 7, thus forming at least a first foot fitting 17, and said second foot 12 is connected to the second inner surface 8 thus forming at least a second foot fitting 18.

The provision of said first foot fitting 17 and also of said second foot fitting 18 improves the structural resistance of the connecting element 9, the same way as a capital and plinth made at end portions of a column.

According to one embodiment, said at least one bulge 10 is connected to at least one of said first inner surface 7 and said second inner surface 8, thus forming a bulge fitting 16.

The provision of said first foot fitting 17 and also of said second foot fitting 18 and also of said bulge fitting 16 allows an easier extraction of the core material accommodated between the plates 2, 3 during the manufacturing of the ventilated braking band 100.

According to one embodiment, at least one between said first foot fitting 17, said second foot fitting 18 and said bulge fitting 16 comprises a fitting surface 14 which delimits at least one portion of said gap 4, in which said fitting surface 14 comprises at least one curved portion defining at least one radius of curvature.

According to one embodiment, said at least one curved portion of said fitting surface 14 is a concave surface.

According to one embodiment, a median plane m-m is defined, substantially parallel to said first inner surface level z1-z1 and said second inner surface level z2-z2, in which said median plane m-m is substantially equally spaced apart from said first inner surface level z1-z1 and from said second inner surface level z2-z2.

According to one embodiment, said ventilated braking band 100 comprises at least one radially inner edge 21 and at least one radially outer edge 22 which delimit the extension along the radial direction R-R of the ventilated braking band 100.

When in operating conditions, said ventilation channels 15 are adapted to convey the flow of fluid current for cooling the braking band 100 towards said radially outer edge 22.

According to one embodiment, said connecting elements 9 comprise a plurality of pegs. The term "peg" means a connecting element 9 which intersects the median plane m-m in a section of substantially equal extension in all the directions of the median plane m-m. For example, the section of the peg may be circular or elliptical or low eccentricity.

According to one embodiment, said connecting elements 9 comprise a plurality of fins. The term "fin" means a connecting element 9 which intersects the median plane m-m in a section of prevailing extension in one direction with respect to the others. For example, there may be defined radial fins of prevailing extension along the radial direction R-R, or circumferential fins of prevailing extension along a circumferential direction C-C, or oblique fins of prevailing extension along a direction of the median plane m-m not which is parallel to the radial direction R-R or to the circumferential direction C-C.

According to one embodiment, said connecting elements 9 comprise a plurality of pegs and a plurality of fins.

The shape and arrangement of the connecting elements 9 may vary and be specifically designed to delimit ventilation channels 15 of predetermined flow rate, speed and also turbulence.

According to one embodiment, said ventilated braking band 100 comprises a plurality of bulges 10 and each bulge 10 is partially interpenetrated with at least one connecting element 9.

According to one embodiment, each connecting element 9 is interpenetrated with a least one bulge 10.

According to one embodiment, at least two connecting elements 9 are interpenetrated with a single bulge 10 so as to form a structural continuity.

The arrangement of the bulges 10 with respect to the connecting elements 9 and also the volume of said bulges 10 may vary and be specifically designed to give the flow of cooling fluid current of the braking band 100 a predetermined level of turbulence when in operating conditions, for example by means of the arrangement of a plurality of constrictions.

According to one embodiment, the distribution of said plurality of bulges 10 is substantially symmetrical with respect to or mirrors the median plane m-m. This allows an easier manufacturing by means of known foundry techniques.

According to one embodiment, said ventilated braking band 100 has a modular structure and comprises a plurality of replicas of a module W placed side-by-side in circumferential direction C-C, in which said module W extends between said at least one radially inner edge 21 and at least one radially outer edge 22 along a connection direction y-y, and in which said module W comprises a portion of said first plate 2, a portion of said second plate 3, at least one connecting element 9 and at least one bulge 10.

Due to the provision of said modular structure of the ventilated braking band 100, a uniformly distributed and controlled flow of fluid current for cooling the braking band may be supplied, thus allowing a uniform and predictable cooling of the braking band 100 when it is in operating conditions.

According to one embodiment, said ventilation channels 15 extend between said radially inner edge 21 and said radially outer edge 22 along a direction which is substantially parallel to said connection direction y-y. This allows the average outflow direction of the flow of fluid current for cooling the braking band, or the prevailing outflow direction of the flow of fluid current for cooling the braking band, to be substantially coincident or parallel to said connection direction y-y.

Figure 5:
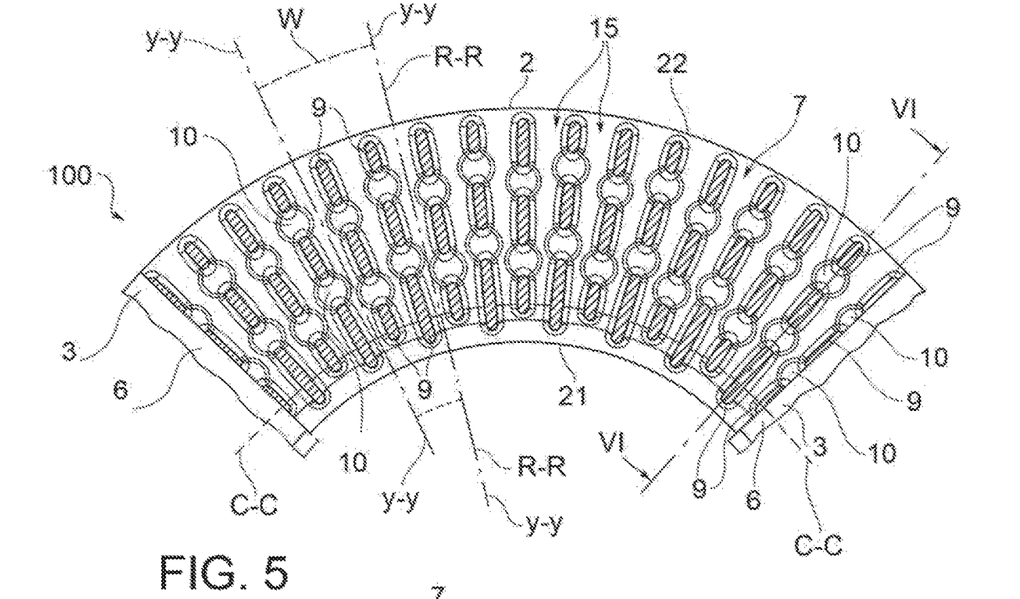
FIG. 5 is a front view of a portion of a ventilated braking band according to one embodiment, in which a plate is partially cross-sectioned.
Figure 6:
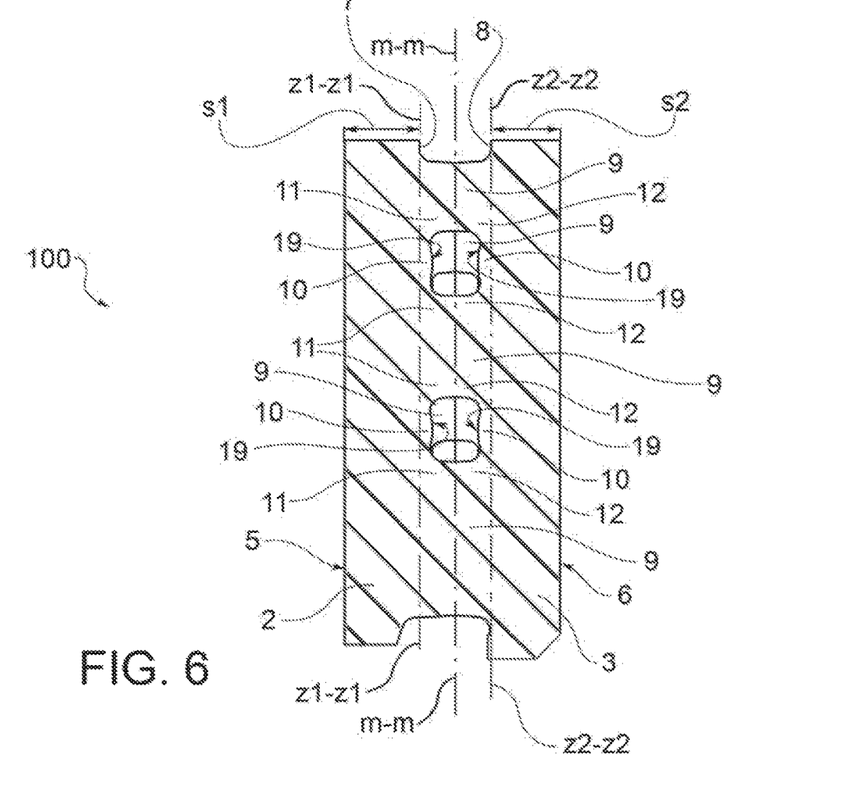
FIG. 6 is a sectional view of a ventilated braking band according to a cutting plane parallel to line VI-VI in FIG. 5.
Figure 7:
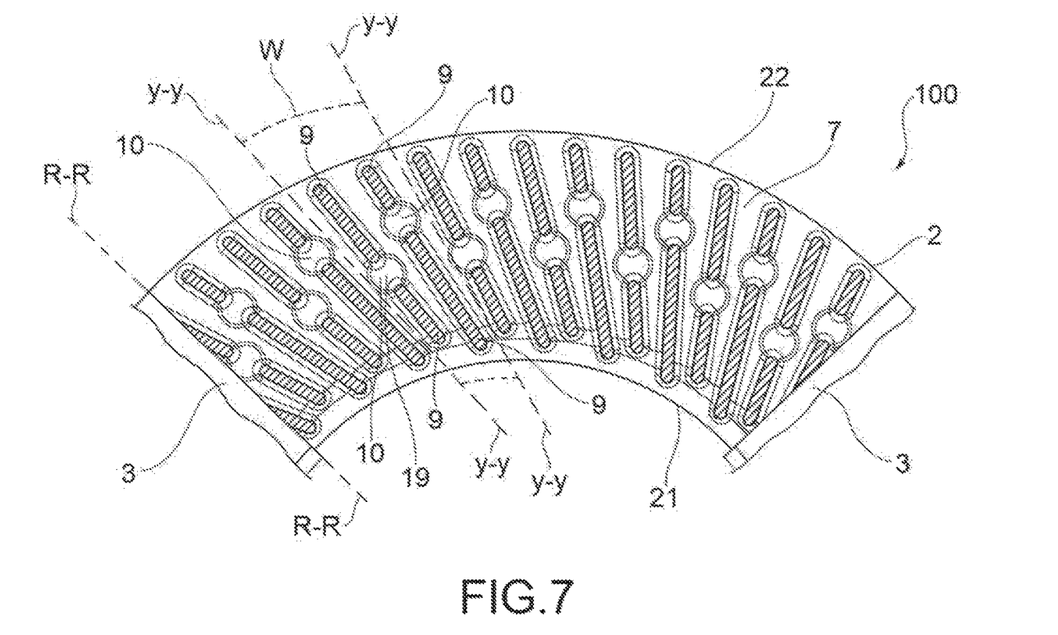
FIGS. 7, 8, 9, 10 and 11 are front views of certain portions of ventilated braking band according to certain embodiments, in which a plate is partially cross-sectioned.

According to one embodiment, shown for example in FIG. 5 or FIG. 7, said module W comprises at least two connecting elements 9 which extend along the connection direction y-y aligned with one another, and in which said at least two connecting elements 9 are both interpenetrated with a single bulge 10.

The provision of this feature allows to form constrictions inside said gap 4 at least along the circumferential direction C-C, or to form circumferential constrictions which partially occlude the flow of fluid current for cooling the braking band 100 along the circumferential direction C-C, thus imposing turbulent motions to the flow of fluid current for cooling the braking band 100 and promoting the outflow of the flow of fluid current for cooling the braking band 100 along the connection direction y-y.

According to one embodiment, each bulge 10 comprises a top point 19 or a maximum axial extension point 19, in which the extension of the bulge along the axial direction A-A is maximum.

For example, when said at least one bulge 10 is substantially hemispherical in shape, said top point 19 is placed substantially in the middle of bulge 10 assessed on a plane comprising the radial R-R and circumferential C-C directions and intersecting at least one section of said bulge 10.

According to one embodiment, said module W comprises connecting elements 9 and top points 19 aligned along the connection direction y-y.

According to one embodiment, said module W comprises three connecting elements 9 and at least two bulges 10, in which said three connecting elements 9 extend aligned along the connection direction y-y, and in which said at least three connecting elements 9 are interpenetrated in pairs with a bulge 10.

According to one embodiment, said module W comprises at least two groups each comprising at least two connecting elements 9 and a bulge 10, in which said at least two connecting elements 9 extend along the connection direction y-y aligned with one another, and in which said at least two connecting elements 9 are both interpenetrated with a single bulge 10, and in which the top point 19 of bulge 10 of one group is placed offset along the radial direction R-R with respect to the top point 19 of bulge 10 of the other group.

Thereby, circumferential constrictions offset along the circumferential direction C-C are caused inside said gap 4, thus imposing turbulent motions to the flow of fluid current for cooling the braking band 100.

According to one embodiment, said module W comprises at least two groups each comprising three connecting elements 9 and at least two bulges 10, in which said three connecting elements 9 extend aligned along the connection direction y-y, and in which said at least three connecting elements 9 are interpenetrated in pairs with a bulge 10, and in which the top points 19 of the bulges 10 of one group are placed offset along the radial direction R-R with respect to the top points 19 of the bulges 10 of the other group.

Thereby, circumferential constrictions offset along the circumferential direction C-C are caused inside said gap 4, thus imposing turbulent motions to the flow of fluid current for cooling the braking band 100.

Figure 8:
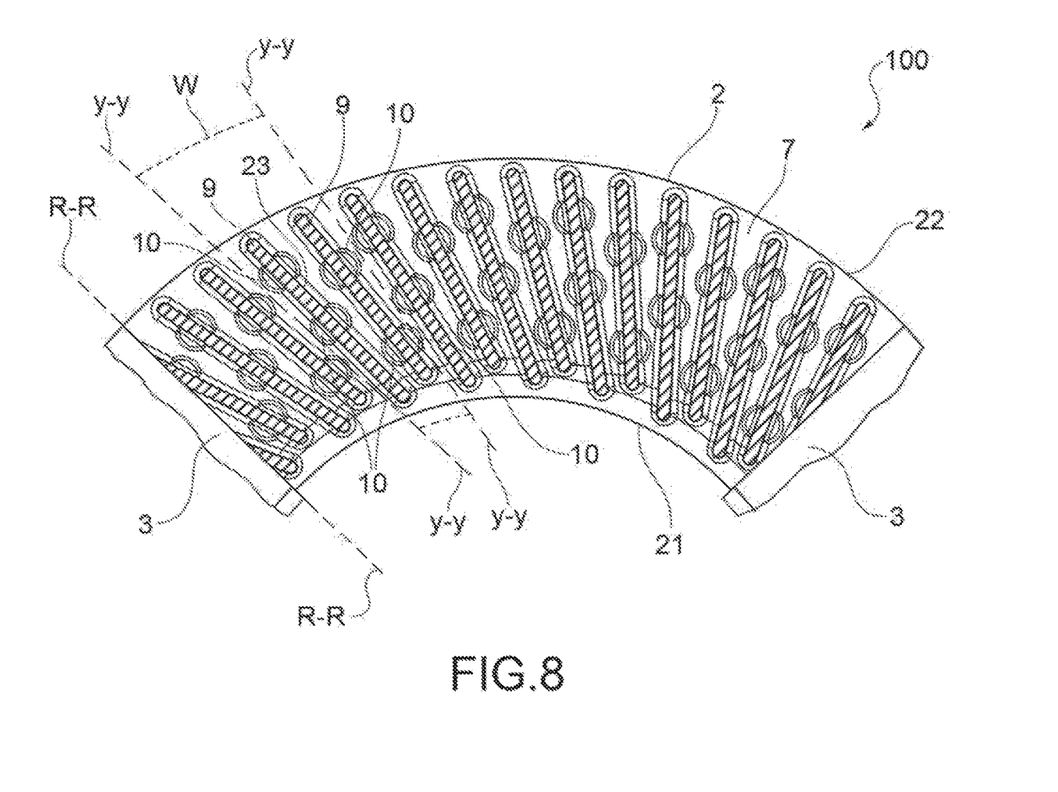
Figure 9:
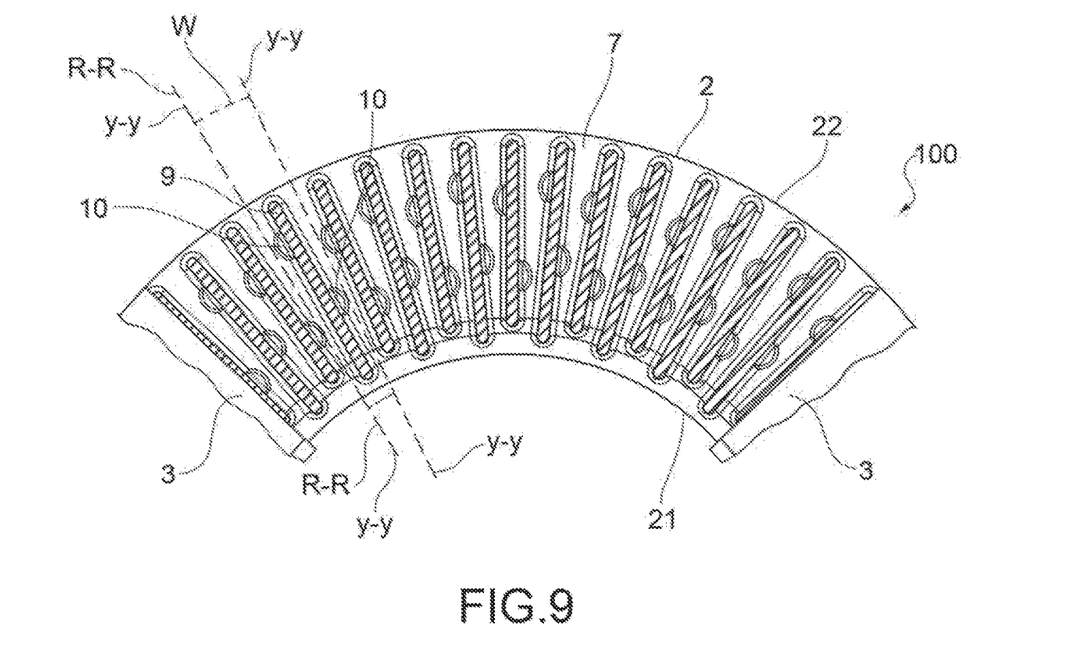
Figure 10:
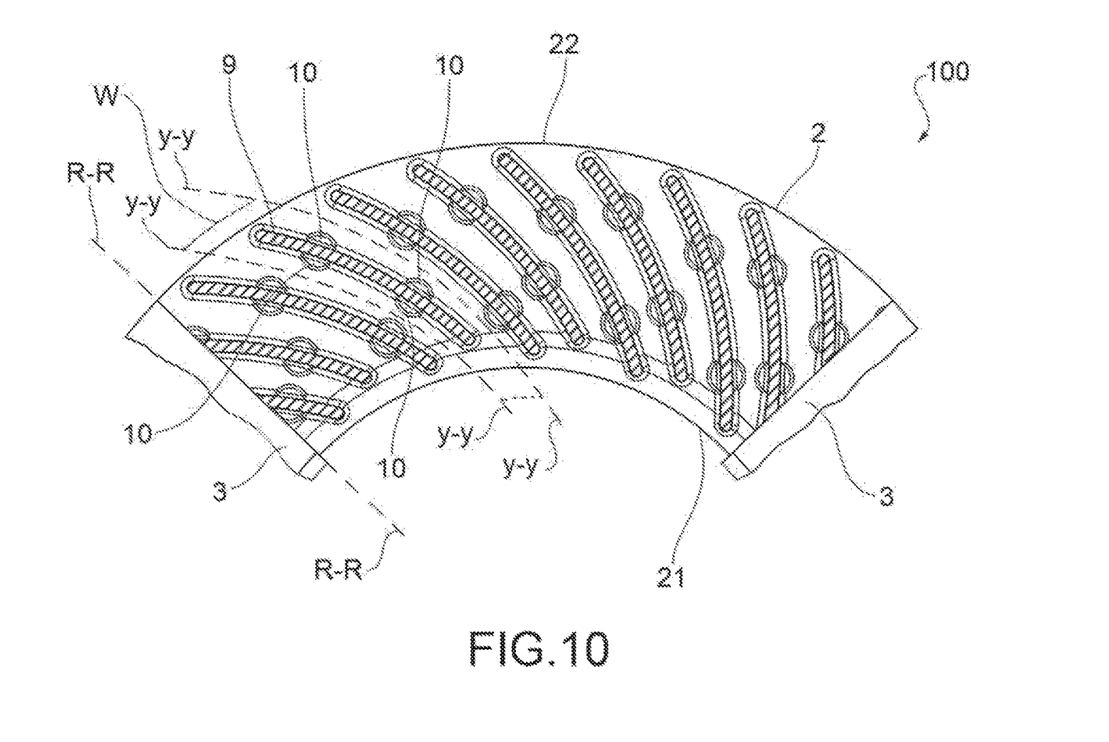

According to one embodiment, shown for example in FIG. 8 or in FIG. 9 or in FIG. 10, each module W comprises at least one connecting element 9 which extends along the connection direction y-y, and in which said at least one connecting element 9 is interpenetrated with at least two bulges 10.

According to one embodiment, each connecting element 9 comprises two side walls 23 which each delimit at least one portion of a ventilation channel 15.

According to one embodiment, said module W comprises at least one connecting element 9 interpenetrated with at least two bulges 10, in which said at least two bulges 10 form a structural continuity with at least one portion of said side walls 23.

The provision of this feature allows to form constrictions inside said gap 4 at least along the connection direction y-y, which partially occlude the flow of fluid current for cooling the braking band 100 along the connection direction y-y, thus imposing local accelerations and turbulent motions to the flow of fluid current for cooling the braking band 100.

According to one embodiment, said module W comprises at least one connecting element 9 interpenetrated with at least two bulges 10, in which said at least two bulges 10 form a structural continuity with at least one portion of said side walls 23, and in which the top points 19 of said at least two bulges 10 are aligned with one another along the circumferential direction C-C.

According to one embodiment, said module W comprises at least one connecting element 9 interpenetrated with at least two bulges 10, in which said at least two bulges 10 form a structural continuity with at least one portion of said side walls 23, and in which the top points 19 of said at least two bulges 10 are offset with one another along the circumferential direction C-C.

According to one embodiment, said module W comprises at least two groups each comprising at least one connecting element 9 interpenetrated with at least two bulges 10, in which said at least two bulges 10 form a structural continuity with at least one portion of said side walls 23, and in which the top points 19 of said at least two bulges 10 of one group are placed offset along the circumferential direction C-C with respect to the top points 19 of said at least two bulges 10 of the other group, and in which the connecting element 9 of one group and the connecting element 9 of the other group are both parallel to the connection direction y-y.

According to one embodiment, said connection direction y-y is orthogonal to said axial direction A-A.

According to one embodiment, said connection direction y-y is coincident or parallel to the radial direction R-R.

According to one embodiment, said connection direction y-y is a curved direction which connects said radially inner edge 21 and said radially outer edge 22.

Figure 11:
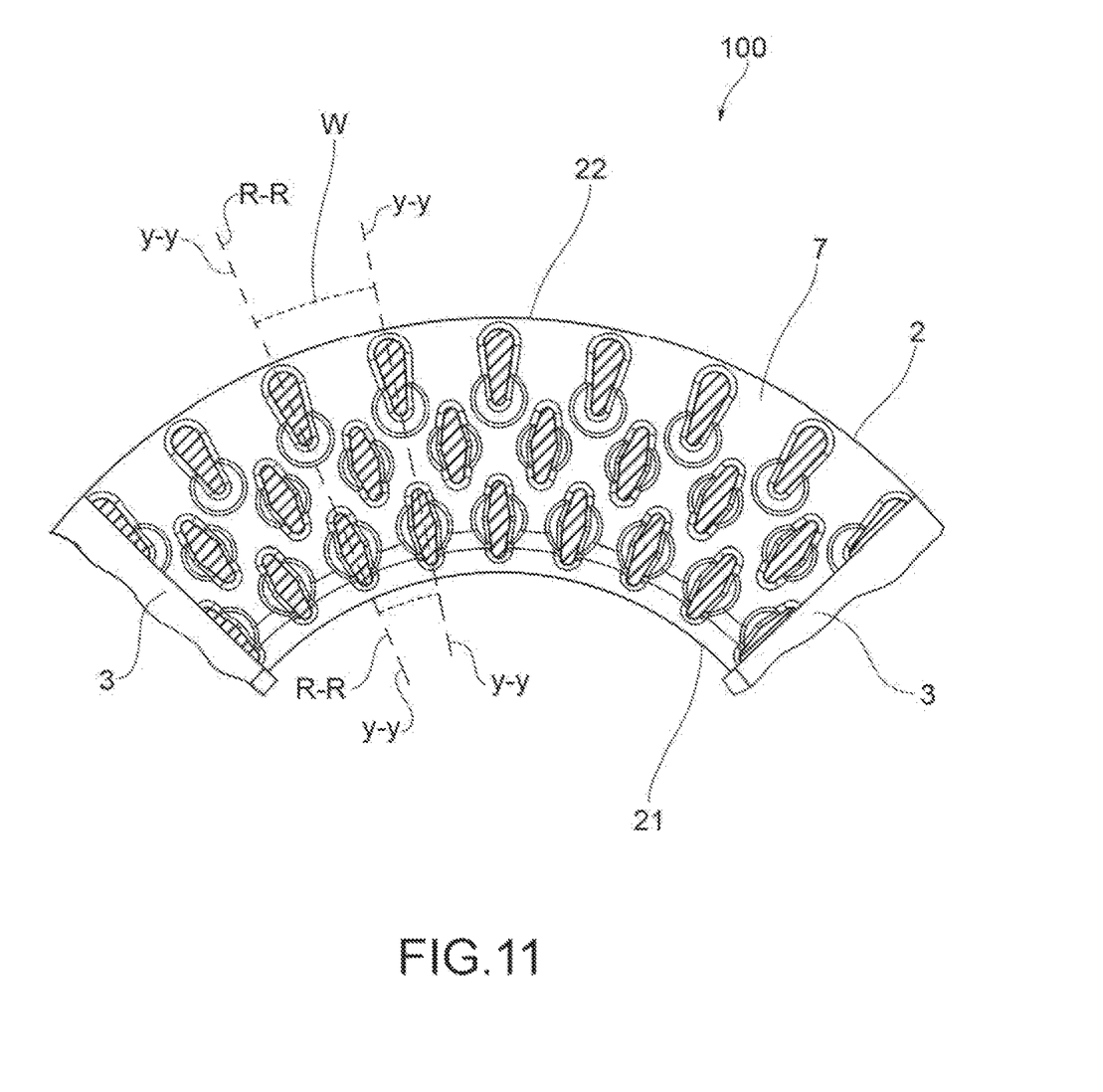

According to one embodiment, shown for example in FIG. 11, said module W comprises at least two connecting elements 9 aligned along the connection direction y-y, in which at least one connecting element 9 is interpenetrated with two bulges 10, and in which said at least two bulges 10 form a structural continuity with portions of the side walls 23 of the connecting element 9, and in which at least one connecting element 9 is interpenetrated with a single bulge 10, and in which said module W further comprises at least one further connecting element 9, which is misaligned with respect to said at least two connecting elements 9 both in circumferential direction C-C and in radial direction R-R.

According to a general embodiment, a ventilated brake disc assembly 1 comprises at least one ventilated braking band 100 according to any one of the claims described above, and at least one disc bell 103.

According to one embodiment, said ventilated braking band 100 and said disc bell 103 are made in a single piece. In other words, said ventilated brake disc assembly 1 is made in a single piece.

According to one embodiment, said ventilated braking band 100 and said disc bell 103 are made separately and then assembled, thus forming said ventilated brake disc assembly 1. By way of non-limiting example, said ventilated braking band 100 and said disc bell 103 may be interlocked, geometrically coupled, coupled by means of fastening elements such as screws or rivets, or welded to each other.

A method of ventilating a braking band is described below.

A method ventilating of a braking band comprises the following steps:
 providing a ventilated braking band 100 according to any one of the embodiments described above;
 arranging said connecting elements 9 and said bulges 10 in the ventilated braking band 100, thus causing constrictions at least in one direction between said circumferential direction C-C and said connection direction y-y so as to provide the desired outflow of the flow of cooling fluid current of the braking band when the braking band is in use.

According to a possible operating manner, a method comprises the further step of arranging said connecting elements 9 and said bulges 10 in the ventilated braking band 100, thus causing constrictions at least in radial direction R-R so as to provide the desired outflow of the flow of cooling fluid current of the braking band when the braking band is in use.

According to a possible operating manner, a method comprises the further step of arranging said connecting elements 9 and said bulges 10 in the ventilated braking band 100, thus causing constrictions at least in axial direction A-A so as to provide the desired outflow of the flow of cooling fluid current of the braking band when the braking band is in use.

Those skilled in the art may make many changes and adaptations to the embodiments described above or can replace elements with others which are functionally equivalent in order to satisfy contingent needs without however departing from the scope of the appended claims.

LIST OF REFERENCES

1 Ventilated brake disc assembly
 2 First plate
 3 Second plate
 4 Gap
 5 First braking surface
 6 Second braking surface
 7 First inner surface
 8 Second inner surface
 9 Connecting elements
 10 Bulge
 11 First foot 12 Second foot
13 Bulge surface
14 Fitting surface
15 Ventilation channels
16 Bulge fitting
17 First foot fitting
18 Second foot fitting
19 Top point
21 Radially inner edge
22 Radially outer edge
23 Side wall
100 Ventilated braking band
101 First pad
102 Second pad
103 Disc bell
A-A Axial direction
X Rotation axis
R-R Radial direction
C-C Tangential or circumferential direction
z1-z1 First inner surface level
z2-z2 Second inner surface level
s1 First plate thickness
s2 Second plate thickness
m-m Median plane
W Module
y-y Connection direction

The invention claimed is:

1. A ventilated braking band for a brake disc defining an axial direction coinciding with the rotation axis of the brake disc, a radial direction orthogonal to the axial direction, and a tangential or circumferential direction orthogonal to both the axial direction and the radial direction;
said ventilated braking band comprises a first plate and a second plate, which are coaxial to the same axial direction;
said first plate and said second plate are mutually spaced apart in the axial direction so as to delimit a gap therebetween;
wherein said first plate comprises a first braking surface adapted to face at least a first brake pad of a brake caliper which can be associated with said ventilated braking band; and wherein said second plate comprises a second braking surface parallel and opposite to said first braking surface so as to be adapted to face at least a second brake pad opposite to said first brake pad of said brake caliper which can be associated with said ventilated braking band;
and wherein said first plate comprises at least a first inner surface facing said second plate; and wherein said first inner surface is substantially parallel to said first braking surface; and wherein said second plate comprises a second inner surface facing said first plate; and wherein said second inner surface is substantially parallel to said second braking surface; and wherein said first inner surface defines a first inner surface plane or level coinciding with said first inner surface, and wherein said second inner surface defines a second inner surface plane or level coinciding with said second inner surface;
and wherein said ventilated braking band comprises connecting elements which extend in an axial direction between said first inner surface and said second inner surface, connecting together said first plate and said second plate;
and wherein said connecting elements and said first inner surface and said second inner surface at least partially delimit ventilation channels inside said gap, and wherein said ventilation channels are adapted to convey a fluid current flow for cooling said ventilated braking band;
and wherein each connecting element comprises at least a first foot which connects each connecting element to said first inner surface, and at least a second foot which connects each connecting element to said second inner surface;
and wherein said ventilated braking band comprises at least one bulge which protrudes from one of said first or second plates in said gap without reaching the opposite first or second plate; and wherein said at least one bulge substantially has the shape of at least one portion of a sphere, said sphere providing said at least one bulge with a circumferential width greater than a circumferential width of one of said connecting elements on which said bulge is located, wherein said circumferential width of said bulge is also greater than said first foot;
wherein said at least one bulge is partially interpenetrated with at least one portion of said first foot, thus forming a structural continuity with said first foot and said connecting element, thus substantially avoiding discontinuities which separate said first foot from said bulge and the connecting element, wherein said bulge has an upper surface directly connected to said connecting element without reaching said first inner surface plane.

2. The ventilated braking band according to claim 1, wherein at least one portion of said at least one bulge forms a structural continuity with said second foot, thus avoiding discontinuities which separate said second foot from said at least one bulge, thus exposing said second inner surface level; and/or wherein
said ventilated braking band comprises a plurality of bulges from said at least one bulge which protrude from said first plate and a plurality of bulges from said at least one bulge which protrude from said second plate;
wherein each bulge of said at least one bulge which protrudes from said first plate is partially interpenetrated with at least one portion of said first foot, thus forming a structural continuity with said first foot, thus avoiding said first inner surface level from being reached;
and wherein each bulge of said at least one bulge which protrudes from said second plate is partially interpenetrated with at least one portion of said second foot, thus forming a structural continuity with said second foot, thus avoiding said second inner surface level from being reached.

3. The ventilated braking band according to claim 1, wherein said at least one bulge is made in a single piece with said plates and with said connecting elements; and/or wherein
said at least one bulge comprises a bulge surface which delimits at least one portion of said gap, wherein said bulge surface is in the shape of at least one portion of a spherical cap; and/or wherein said bulge surface is in the shape of a spherical half-cap.

4. The ventilated braking band according to claim 1, wherein said ventilated braking band comprises at least one radially inner edge and at least one radially outer edge which delimit the extension along the radial direction of the ventilated braking band; wherein said ventilated braking band has a modular structure and comprises a plurality of replicas of a module placed side-by-side in circumferential direction, wherein said module extends between at least one radially inner edge and at least one radially outer edge along a connection direction, and wherein said module comprises a portion of said first plate, a portion of said second plate, at least one connecting element of said connecting elements and said at least one bulge; and wherein each bulge comprises a top point or a maximum axial extension point, wherein the extension of the bulge along the axial direction is maximum.

5. The ventilated braking band according to claim 4, wherein each of said modules comprises at least two of said connecting elements which extend along the connection direction aligned with each other, and wherein said at least two connecting elements are both interpenetrated with a single bulge of said at least one bulge; and/or wherein
    each of said modules comprises at least two groups each comprising at least two of said connecting elements and a bulge of said at least one bulge, wherein said at least two connecting elements extend along the connection direction aligned with each other, and wherein said at least two connecting elements are both interpenetrated with a single bulge of said at least one bulge, and wherein the top point of the bulge of one group is placed offset along the radial direction with respect to the top point of of said at least one bulge of the other group.

6. The ventilated braking band according to claim 4, wherein each of said modules comprises at least one connecting element of said connecting elements which extends along the connection direction, and wherein said at least one connecting element is interpenetrated with at least two bulges of said at least one bulge; and wherein
    each connecting element comprises two side walls which each delimit at least one portion of one of said ventilation channels.

7. The ventilated braking band according to claim 4, wherein said module comprises at least two connecting elements of said connecting elements aligned along the connection direction, wherein at least one connecting element of said connecting elements is interpenetrated with two bulges of said at least one bulge, and wherein said at least two bulges form a structural continuity with portions of side walls of a connecting element of said connecting elements, and wherein at least one connecting element of said connecting elements is interpenetrated with a single bulge of said at least one bulge and wherein said module further comprises at least one further connecting element of said connecting elements, which is misaligned with respect to said at least two connecting elements both in circumferential direction and in radial direction.

8. The ventilated brake disc band according to claim 1, further comprising a ventilated brake disc assembly having at least one disc bell.

9. The ventilated brake disc band according to claim 8, wherein said ventilated braking band and said disc bell are made in a single piece for said assembly.

10. The ventilated braking band according to claim 1, wherein said first foot is connected to the first inner surface, thus forming at least a first foot fitting; and/or wherein
    said second foot is connected to the second inner surface, thus forming at least a second foot fitting; and/or wherein
    said at least one bulge is connected to at least one of said first inner surface and said second inner surface, thus forming a bulge fitting.

11. The ventilated braking band according to claim 1, wherein said ventilated braking band comprises a plurality of bulges from said at least one bulge and each bulge is partially interpenetrated with at least one of said connecting elements; and/or wherein
    one connecting element from said connecting elements is interpenetrated with at least one of said bulges; and/or wherein
    at least two connecting elements are interpenetrated with a single bulge of said at least one bulge so as to form a structural continuity.

12. The ventilated braking band according to claim 4, wherein said module comprises three connecting elements from said connecting elements and at least two bulges from said least one bulge, wherein said three connecting elements extend aligned along the connection direction, and wherein said at least three connecting elements are interpenetrated in pairs with a bulge of said at least one bulge; and/or wherein
    said module comprises at least two groups each comprising three connecting elements and at least two bulges, wherein said three connecting elements extend aligned along the connection direction, and wherein said at least three connecting elements are interpenetrated in pairs with a bulge, and wherein top points of the bulges of one group are placed offset along the radial direction with respect to top points of the bulges of the other group.

13. The ventilated braking band according to claim 12, wherein said module comprises at least one connecting element from said connecting elements interpenetrated with at least two bulges of said at least one bulge, wherein said at least two bulges of said at least one bulge form a structural continuity with at least one portion of said side walls, and wherein the top points of said at least two bulges are aligned with each other along the circumferential direction; or wherein
    said module comprises at least one connecting element of said connecting elements interpenetrated with at least two bulges of said at least one bulge, wherein said at least two bulges form a structural continuity with at least one portion of said side walls, and wherein the top points of said at least two bulges are offset from each other along the circumferential direction.

14. The ventilated braking band according to claim 12, wherein said module comprises at least two groups each comprising at least one connecting element of said connecting elements interpenetrated with at least two bulges of said at least one bulge, wherein said at least two bulges form a structural continuity with at least one portion of said side walls, and wherein the top points of said at least two bulges of one group are placed offset along the circumferential direction with respect to the top points of said at least two bulges of the other group, and wherein the connecting element of one group and the connecting element of the other group are both parallel to the connection direction.

15. A method of ventilating a braking band, comprising the following steps:
    providing a ventilated braking band according to claim 1;
    arranging said connecting elements and said bulges in the ventilated braking band, thus causing constrictions at least in one direction between said circumferential direction and said connection direction so as to provide the flow of cooling fluid current of the braking band when the braking band is in use.

16. A ventilated braking band for a brake disc defining an axial direction coinciding with the rotation axis of the brake disc, a radial direction orthogonal to the axial direction, and a tangential or circumferential direction orthogonal to both the axial direction and the radial direction;

said ventilated braking band comprises a first plate and a second plate, which are coaxial to the same axial direction;
said first plate and said second plate are mutually spaced apart in the axial direction so as to delimit a gap therebetween;
wherein said first plate comprises a first braking surface adapted to face at least a first brake pad of a brake caliper which can be associated with said ventilated braking band; and wherein said second plate comprises a second braking surface parallel and opposite to said first braking surface so as to be adapted to face at least a second brake pad opposite to said first brake pad of said brake caliper which can be associated with said ventilated braking band;
and wherein said first plate comprises at least a first inner surface facing said second plate; and wherein said first inner surface is substantially parallel to said first braking surface; and wherein said second plate comprises a second inner surface facing said first plate; and wherein said second inner surface is substantially parallel to said second braking surface; and wherein said first inner surface defines a first inner surface plane or level coinciding with said first inner surface, and wherein said second inner surface defines a second inner surface plane or level coinciding with said second inner surface;
and wherein said ventilated braking band comprises connecting elements which extend in an axial direction between said first inner surface and said second inner surface, connecting together said first plate and said second plate;
and wherein said connecting elements and said first inner surface and said second inner surface at least partially delimit ventilation channels inside said gap, and wherein said ventilation channels are adapted to convey a fluid current flow for cooling said ventilated braking band;
and wherein each connecting element comprises at least a first foot which connects each connecting element to said first inner surface, and at least a second foot which connects each connecting element to said second inner surface;
and wherein said ventilated braking band comprises at least one bulge which protrudes from one of said first or second plates in said gap without reaching the opposite first or second plate; and wherein said at least one bulge substantially has the shape of at least one portion of a sphere, said sphere extends said at least one bulge into one of said ventilation channels to provide a connecting element on which said bulge is located with a circumferential width greater than a circumferential width of the connecting element alone, wherein said circumferential width of said bulge is also greater than said first foot on said connecting element;
wherein said at least one bulge is partially interpenetrated with at least one portion of said first foot, thus forming a structural continuity with said first foot and said connecting element, thus substantially avoiding discontinuities which separate said first foot from said bulge and the connecting element, wherein said bulge has an upper surface directly connected to said connecting element without reaching said first inner surface plane.

* * * * *